United States Patent
Ito et al.

(10) Patent No.: US 12,390,719 B2
(45) Date of Patent: Aug. 19, 2025

(54) OPERATION DEVICE

(71) Applicant: ALPS ALPINE CO., LTD., Tokyo (JP)

(72) Inventors: Masashi Ito, Miyagi (JP); Masatoshi Ono, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 423 days.

(21) Appl. No.: 18/058,969

(22) Filed: Nov. 28, 2022

(65) Prior Publication Data

US 2023/0091802 A1 Mar. 23, 2023

Related U.S. Application Data

(63) Continuation of application No. PCT/JP2021/019449, filed on May 21, 2021.

(30) Foreign Application Priority Data

Jun. 3, 2020 (JP) ................. 2020-097194

(51) Int. Cl.
 *A63F 13/24* (2014.01)
(52) U.S. Cl.
 CPC ...... *A63F 13/24* (2014.09); *A63F 2300/1006* (2013.01); *A63F 2300/1043* (2013.01)
(58) Field of Classification Search
 CPC ............ A63F 13/24; A63F 2300/1006; A63F 2300/1043; G05G 5/05; G05G 9/047; H01H 3/32
 See application file for complete search history.

(56) References Cited

U.S. PATENT DOCUMENTS

| | | | |
|---|---|---|---|
| 2018/0174783 A1* | 6/2018 | Wu | G05G 9/047 |
| 2020/0097037 A1* | 3/2020 | Asano | G05G 9/047 |

FOREIGN PATENT DOCUMENTS

| | | |
|---|---|---|
| JP | H04-036618 U | 3/1992 |
| JP | 2013-242972 | 12/2013 |
| JP | 2018-523274 | 8/2018 |

OTHER PUBLICATIONS

International Search Report for PCT/JP2021/019449 mailed on Jun. 15, 2021.

\* cited by examiner

*Primary Examiner* — Peter J Iannuzzi
(74) *Attorney, Agent, or Firm* — IPUSA, PLLC (57) ABSTRACT

An operation device includes a lever operable to tilt and an actuator having an opening through which the lever is disposed and including a rotation shaft, the actuator being configured to rotate in accordance with the tilting of the lever, such that the rotation shaft of the actuator is rotatably supported within a shaft-receiving hole. The operation device includes a biasing unit configured to bias the lever upward. The lever includes a push-up portion configured to force a portion of the actuator upward in accordance with a biasing force from the biasing unit, the portion of the actuator being disposed around the opening of the actuator.

3 Claims, 12 Drawing Sheets

OPERATION DEVICE

CROSS-REFERENCE TO RELATED APPLICATIONS

This application is a continuation application of International Application No. PCT/JP2021/019449, filed on May 21, 2021, and designated the U.S., which is based upon and claims priority to Japanese Patent Application No. 2020-097194, filed on Jun. 3, 2020, the entire contents of which are incorporated herein by reference.

BACKGROUND

1. Field of the Invention

The present disclosure relates to an operation device.

2. Description of the Related Art

For example, Patent Document 1 discloses a multidirectional input device, and the multidirectional input device includes an interlocking member that rotates about a coupling piece as a rotation axis, in response to a tilt of an operation member. Also, the multidirectional input device is configured to detect a tilt angle of the operation member in accordance with the rotation of the interlocking member.

RELATED-ART DOCUMENTS

Patent Document

[Patent Document 1] Japanese Unexamined Patent Application Publication No. 2013-242972

However, in a technique disclosed in Patent Document 1, backlash occurs due to a clearance between the operation member and the interlocking member, and thus there may be cases where the interlocking member does not return to a neutral position even when the operation member returns to a neutral state. As a result, an output signal may not convey a value indicating the neutral state.

An operation device according to one embodiment includes a lever operable to tilt and an actuator having an opening through which the lever is disposed and including a rotation shaft, the actuator being configured to rotate in accordance with the tilting of the lever, such that the rotation shaft of the actuator is rotatably supported within a shaft-receiving hole. The operation device includes a biasing unit configured to bias the lever upward. The lever includes a push-up portion configured to force a portion of the actuator upward in accordance with a biasing force from the biasing unit, the portion of the actuator being disposed around the opening of the actuator.

DESCRIPTION OF THE EMBODIMENTS

One or more embodiments will be described below with reference to the drawings.

(Outline of Operation Device 100)

Figure 1:
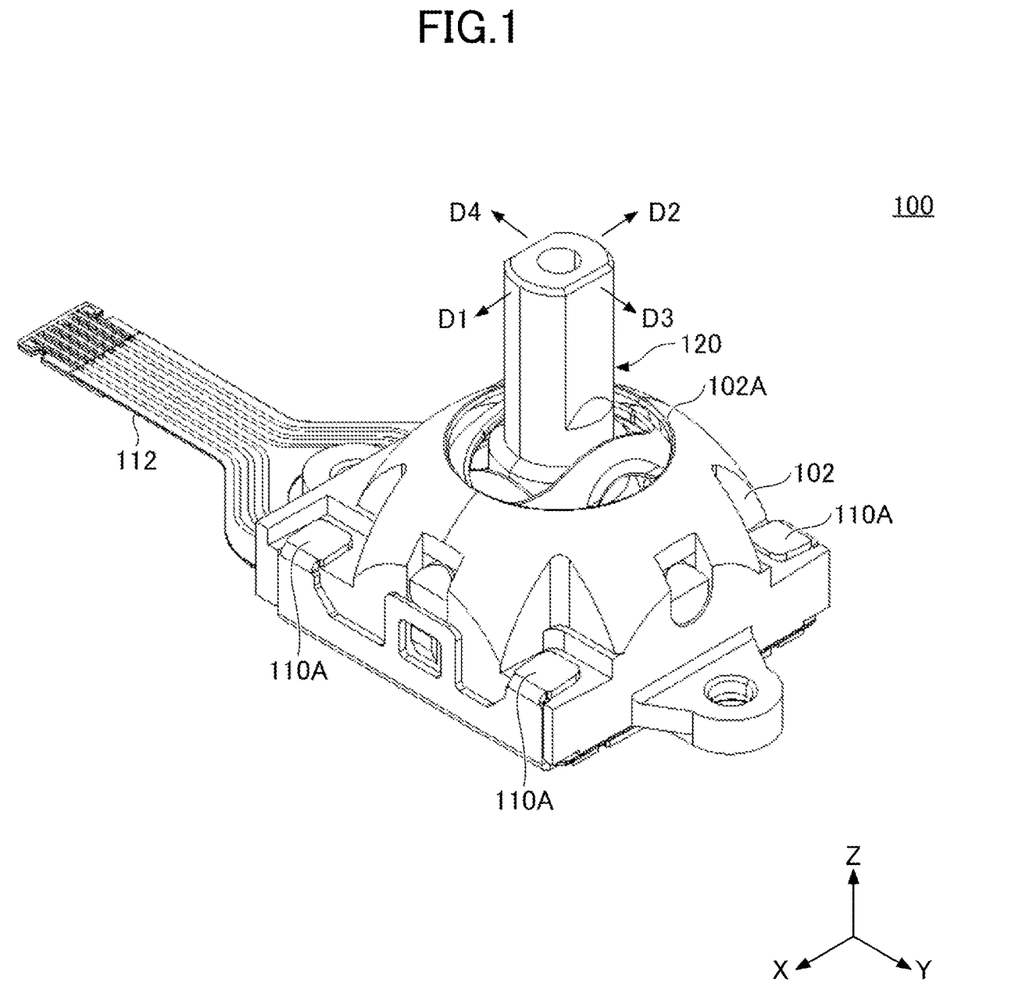
FIG. 1 is an external perspective view of an operation device according to one embodiment.

FIG. 1 is an external perspective view of an operation device 100 according to one embodiment. In the following description, for the sake of convenience, in the drawings, a Z-axis direction may be referred to as an up-down direction, an X-axis direction may be referred to as a front-back direction, and a Y-axis direction is referred to as a left-right direction.

The operation device 100 illustrated in FIG. 1 is used for a controller or the like relating to a game device or the like. As illustrated in FIG. 1, the operation device 100 includes a columnar lever 120 that is operable to tilt, and the lever 120 protrudes upward (in a positive Z-axis direction) from an opening 102A in a case 102. In the operation device 100, the lever 120 is operable to tilt in all directions, such as forward and backward (directions indicated by the arrows D1 and D2 in the figure) and left and right (directions indicated by the arrows D3 and D4 in the figure). Also, the operation device 100 can externally output, via a flexible printed circuit (FPC) 112, an operation signal in accordance with the tilting (i.e., a tilting direction and a tilt angle) of the lever 120.

(Configuration of Operation Device 100)

Figure 2:
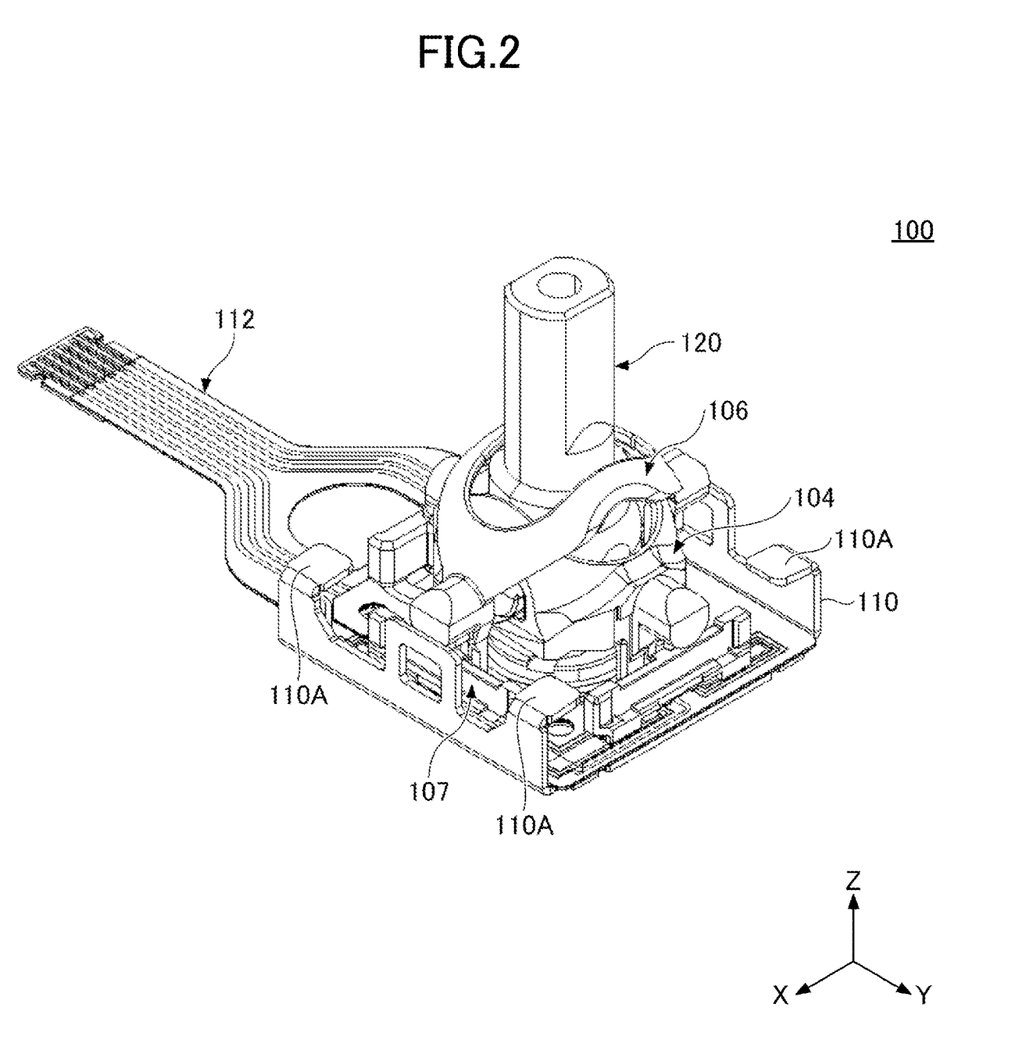
FIG. 2 is an external perspective view of the operation device from which a case is removed according to one embodiment.
Figure 3:
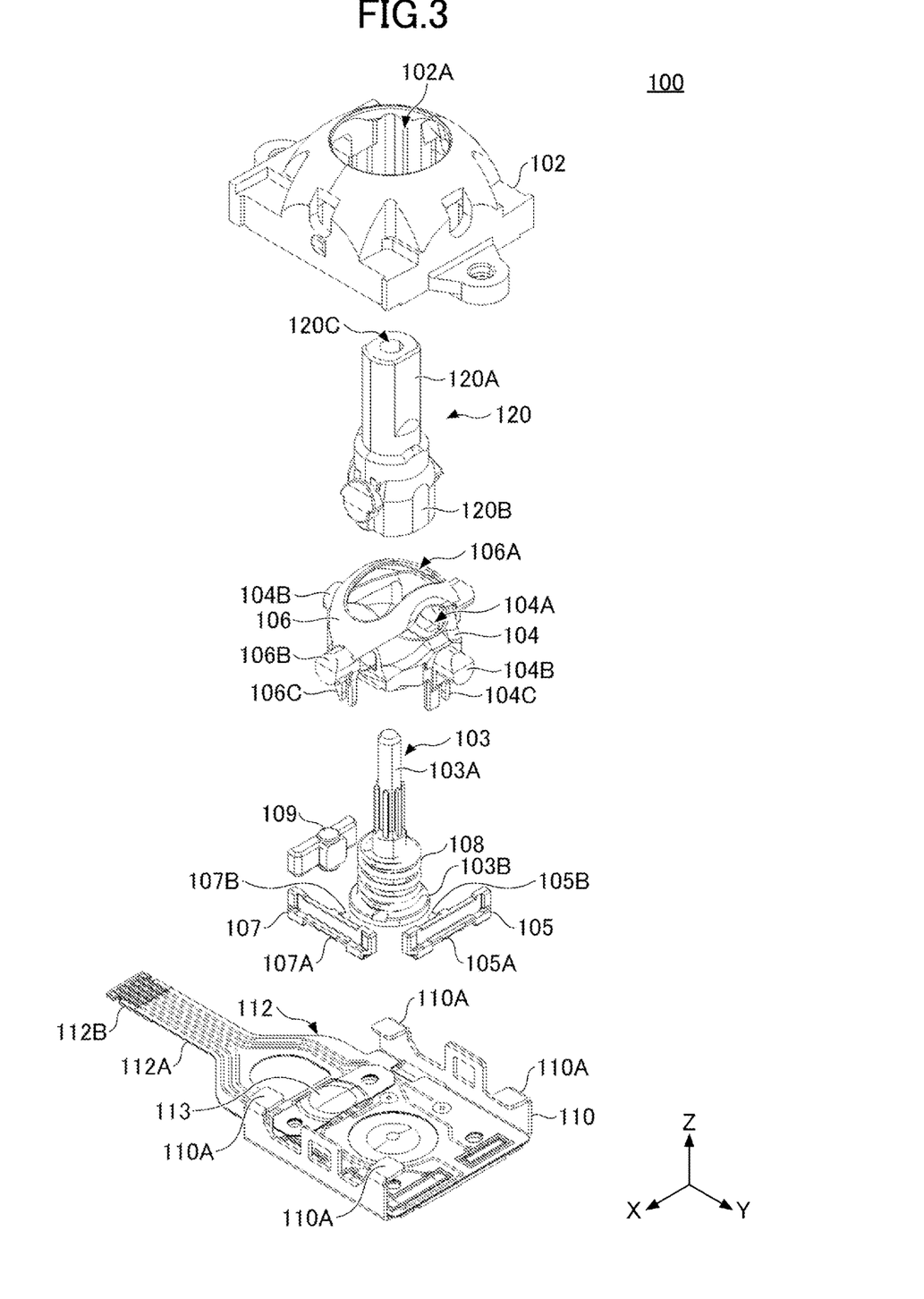
FIG. 3 is an exploded perspective view of the operation device according to one embodiment.
Figure 4:
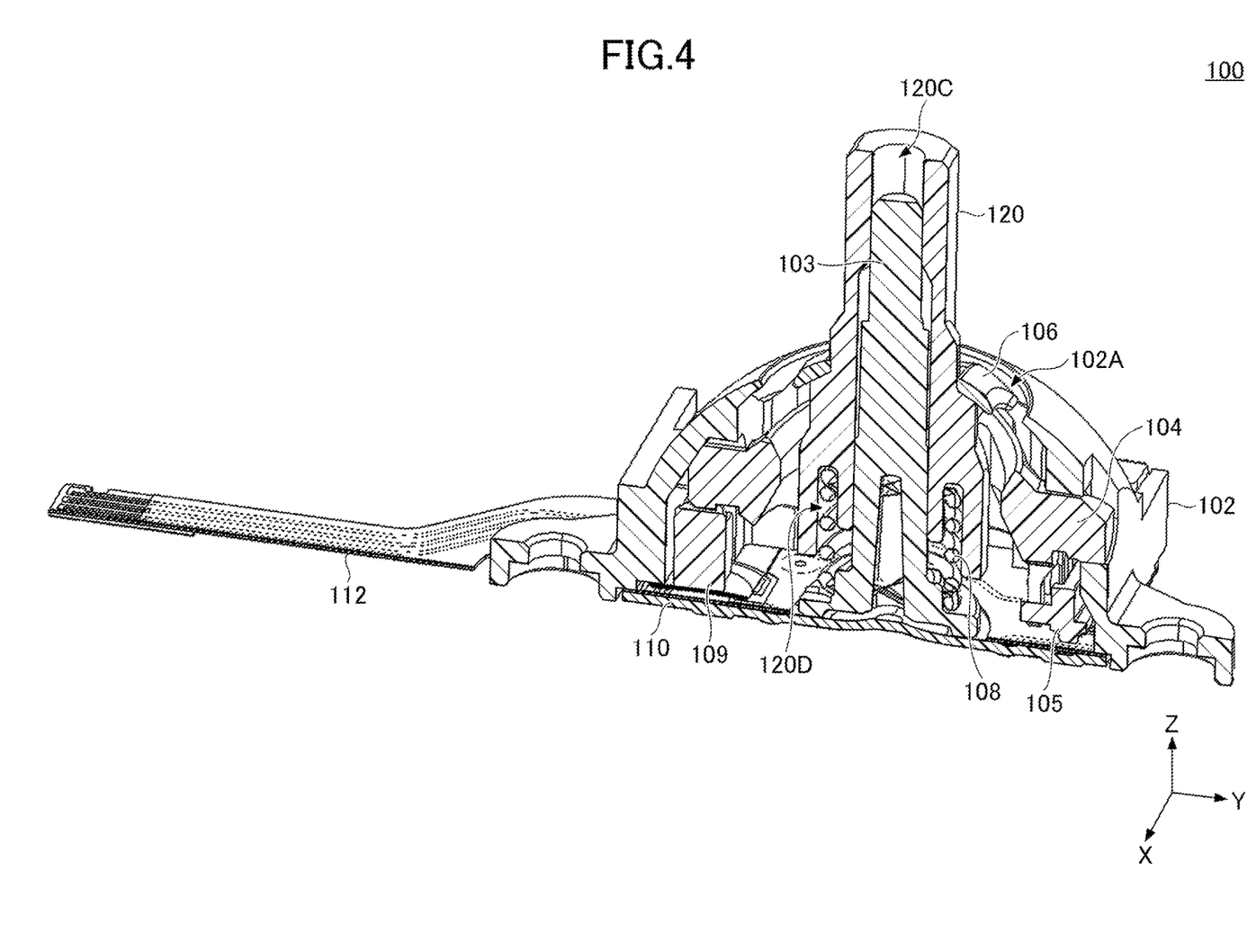
FIG. 4 is a perspective cross-sectional view of the operation device according to one embodiment.

FIG. 2 is an external perspective view of the operation device 100 from which the case 102 is removed according to one embodiment. FIG. 3 is an exploded perspective view of the operation device 100 according to one embodiment. FIG. 4 is a cross-sectional view of the operation device 100 according to one embodiment.

As illustrated in FIGS. 2 to 4, the operation device 100 includes the case 102, the lever 120, a second actuator 104, a first actuator 106, a shaft 103, a spring 108, a second holder 105, a first holder 107, a pressing member 109, a frame 110, the FPC 112, and a metal sheet 113.

The case 102 has an upwardly protruding dome shape. Components are incorporated in an internal space of the case 102. An opening 102A is formed on a top side of a dome shaped portion of the case 102, and the opening 102A has a circular shape in a plan view viewed from above.

The lever 120 is a member that is operably tilted by an operator. The lever 120 includes a lever portion 120A and a base 120B. The lever portion 120A is a substantially cylindrical portion that protrudes upward from the opening 102A of the case 102, and the substantially cylindrical portion is operable to tilt through the operator. The base 120B is a substantially cylindrical portion that supports a lower end of the lever portion 120A within the case 102, and the substantially cylindrical portion of the base 120B rotates in accordance with the tilting of the lever portion 120A.

The second actuator 104 has a curved and upwardly protruding dome shape, and has an elongated opening 104A that extends in the left-right direction (Y-axis direction in the figures) along the curved shape. The second actuator 104 includes a rotation shaft 104B, both ends of which protrude outward in the left-right direction. The rotation shaft 104B is supported by the case 102. In accordance with the tilting of the lever 120 in the front-back direction (X-axis direction in the figures), the second actuator 104 is provided to be rotatable about the rotation shaft 104B to move in the front-back direction (X-axis direction in the figures).

The first actuator 106 is provided to be stacked on of the second actuator 104. The first actuator 106 has a curved and upwardly protruding dome shape, and has an elongated opening 106A that extends in the front-back direction (X-axis direction in the figures) along the curved shape. The first actuator 106 includes a rotation shaft 106B, both ends of which protrude outward in the front-back direction. The rotation shaft 106B is supported by the case 102, and in accordance with the tilting of the lever 120 in the left-right direction (Y-axis direction in the figures), the first actuator 106 is provided to be rotatable about the rotation shaft 106B to move in the left-right direction (Y-axis direction in the figures).

The second holder 105 is provided on a right side (positive Y-axis side) of the second actuator 104. The second holder 105 holds a second slider 105A at a bottom surface of the second holder 105. The second holder 105 has a shape that extends longitudinally in a sliding direction (X-axis direction) of the second slider 105A. The second holder 105 is provided to be slidable in the sliding direction (X-axis direction) of the second slider 105A. A second cylindrical protrusion 105B that protrudes toward the second actuator 104 is provided at a central portion of a side surface of the second holder 105 on the second actuator 104-side (negative Y-axis side).

The first holder 107 is provided on a front side (positive X-axis side) of the first actuator 106. The first holder 107 holds the first slider 107A at a bottom surface of the first holder 107. The first holder 107 has a shape that extends longitudinally in the sliding direction (Y-axis direction) of the first slider 107A. The first holder 107 is provided to be slidable in the sliding direction (Y-axis direction) of the first slider 107A. A first cylindrical protrusion 107B that protrudes toward the first actuator 106 is provided at a central portion of a side surface of the first holder 107 on the first actuator 106-side (negative X-axis side).

As illustrated in FIGS. 2 to 4, the second actuator 104 and the first actuator 106 respectively overlap each other such that the opening 104A and the opening 106A intersect each other. The second actuator 104 and the first actuator 106, as well as the base 120B of the lever 120, are incorporated in the case 102 in a state where the second actuator 104 and the first actuator 106 overlap each other, in conjunction with a state where the lever portion 120A of the lever 120 passes through the opening 104A and the opening 106A and is combined with the base 120B of the lever 120.

The second actuator 104 includes a second engagement portion 104C that protrudes downward from the rotation shaft 104B that is situated on the positive Y-axis side. The second engagement portion 104C engages with the second protrusion 105B in the second holder 105. When the lever 120 is operated to be tilted in the front-back direction (X-axis direction), the second actuator 104 together with the base 120B of the lever 120 rotates about the Y-axis to move in the front-back direction, and thus the second engagement portion 104C allows the second holder 105 to slide in the front-back direction. With this arrangement, a state of electrical connections between the second slider 105A, which is held at a lower portion of the second holder 105, and resistors 116 and 117 provided in the FPC 112 changes, and thus an operation signal corresponding to resistance values, which are obtained in response to the tilting (a given tilting direction and tilt angle) of the lever 120 in the front-back direction, is output via a connection portion 112B in the FPC 112.

The first actuator 106 includes a first engagement portion 106C that protrudes downward from the rotation shaft 106B that is situated on the positive X-axis side. The first engagement portion 106C engages with the first protrusion 107B of the first holder 107. When the lever 120 is operated to tilt in the left-right direction (Y-axis direction), the first actuator 106 together with the base 120B in the lever 120 rotates about the X-axis to move in the left-right direction, and thus the first engagement portion 106C allows the first holder 107 to slide in the left-right direction. With this arrangement, a state of electrical connections between the first slider 107A, which is held at the lower portion of the first holder 107, and each of a resistor 115 and the resistor 117 that is provided in the FPC 112 changes, and thus a given operation signal corresponding to resistance values, which are obtained in response to the tilting (a given tilting direction and tilt angle) of the lever 120 in the left-right direction, is output via the connection portion 112B in the FPC 112.

The shaft 103 includes a shaft portion 103A and a bottom plate 103B. The shaft portion 103A is a bar-like portion that is round and is disposed to be inserted through a through-hole 120C in the lever 120. The bottom plate 103B is a disk-like portion that is integrally provided at a lower end of the shaft portion 103A.

A spring 108 is an example of a "biasing unit." The spring 108, as well as the shaft 103, are incorporated in a lower opening 120D (see FIG. 4) of the lever 120 on a bottom-surface side (negative Z-axis side)of the lever 120, in a state where insertion of the shaft portion 103A of the shaft 103 is enabled. The spring 108 biases the lever 120 upward, and also biases the bottom plate 103B of the shaft 103 downward. With this arrangement, when the tilting of the lever 120 by the operator is canceled, the spring 108 presses the bottom plate 103B of the shaft 103 against the top surface and central portion of the frame 110, and thus the bottom plate 103B is held in a horizontal state. As a result, the lever 120 returns to the neutral state.

When the lever 120 is forced downward, a pressing member 109 is forced downward by the rotation shaft 104B on the negative Y-axis side of the second actuator 104, and thus the pressing member 109 forces the metal sheet 113, which is provided on the FPC 112, downward. With this arrangement, the metal sheet 113 is elastically deformed, and thus a switch circuit that is formed on the FPC 112 is turned into a conductive state. As a result, a switch on-signal indicating that the lever 120 has been forced downward is output from the FPC 112.

The frame 110 is a plate-like member that is made of metal and closes the opening on the bottom-surface side of the case 102. For example, the frame 110 is formed by various methods (for example, punching, bending, and the like) of processing a metal plate. Two claw portions 110A making a pair are provided with respect to each of a front-side (positive X-axis side) end and a back-side (negative X-axis side) end of the frame 110. As illustrated in FIG.

1, each claw portion 110A is engaged at a corresponding corner of the case 102, so that the frame 110 is fixedly coupled to the case 102.

The FPC 112 is an example of a "substrate" and is a film-like line member that is flexible. The FPC 112 includes an extension portion 112A that extends on the top surface of the frame 110 and protrudes from the side surface (in the negative Y-axis direction in the figures) of the frame 110, and is connected to the outside through the connection portion 112B that is provided at a top end of the extension portion 112A. The FPC 112 externally transmits an operation signal that is obtained in accordance with the operation (tilting and pressing) of the lever 120. The FPC 112 is formed such that both surfaces of the FPC with one or more stripe-shaped conductive lines (for example, copper-foil or the like) are covered with a flexible and insulating film material (for example, a polyimide resin, polyethylene terephthalate (PET), or the like).

(Configuration of FPC 112)

Figure 5:
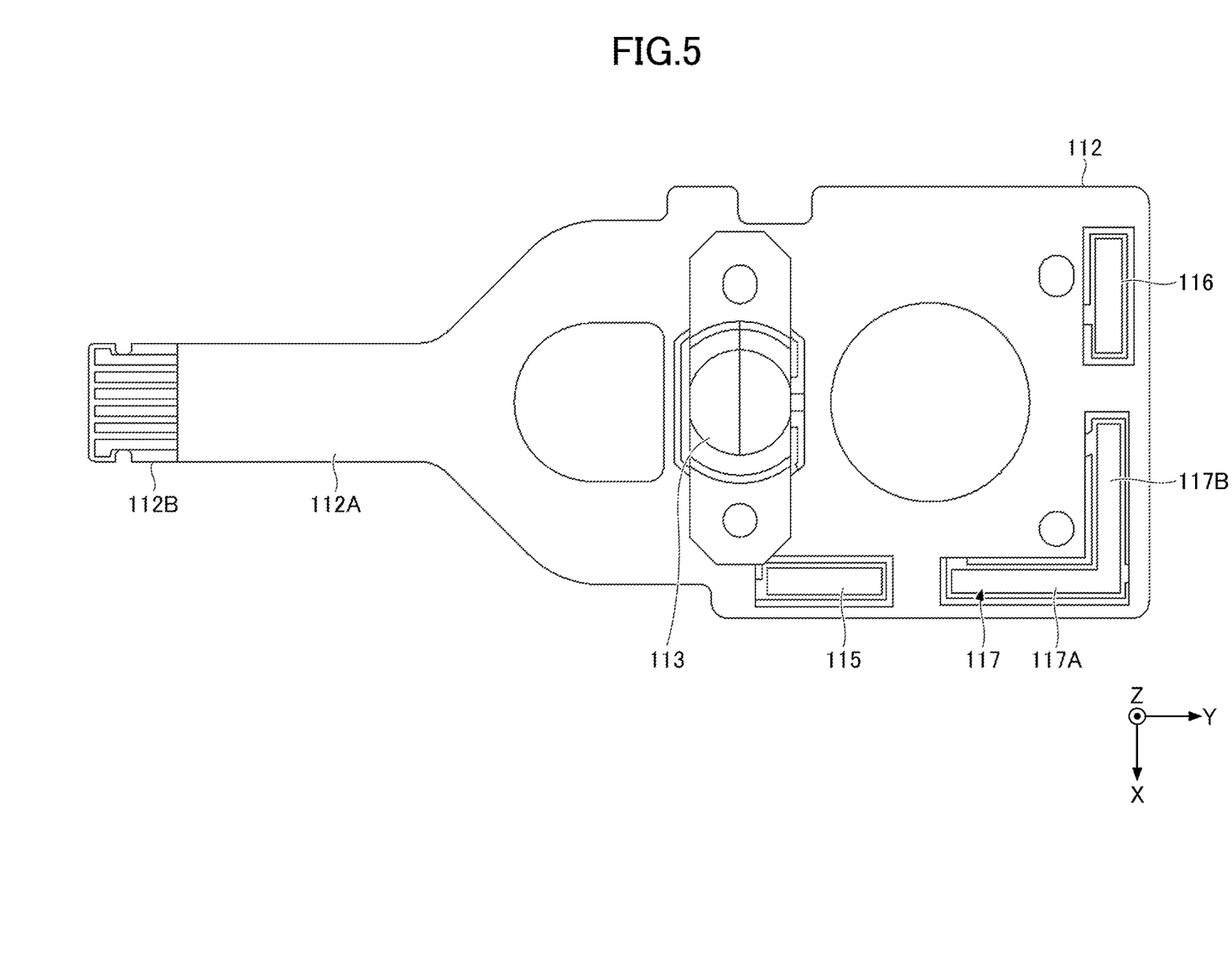
FIG. 5 is a plan view of an FPC included in the operation device according to one embodiment.

FIG. 5 is a plan view of the FPC 112 included in the operation device 100 according to one embodiment. As illustrated in FIG. 5, the resistor 115, the resistor 116, and the resistor 117, all of which are planar and are in the form of a stripe, are provided on the surface of the FPC 112. For example, a carbon fiber material is used to be printed in the form of a thin film to thereby form each of the resistor 115, the resistor 116, and the resistor 117.

The resistor 115 is provided along a front-side (positive X-axis side) edge of the FPC 112. The resistor 115 has a stripe shape that extends linearly in the left-right direction (Y-axis direction).

The resistor 116 is provided along a right-side (positive Y-axis side) edge of the FPC 112. The resistor 116 has a stripe shape that extends linearly in the front-back direction (X-axis direction).

The resistor 117 is provided at a corner at which the front side (positive X-axis side) and right side (positive Y-axis side) of the FPC 112 meet. The resistor 117 has an L-shape that includes a linear portion 117A and a linear portion 117B. The linear portion 117A has a stripe shape that extends linearly in the left-right direction (Y-axis direction). The linear portion 117B has a stripe shape that extends linearly in the front-back direction (X-axis direction).

(Configuration in Which Sliders 105A and 107A Slide)

Figure 6:
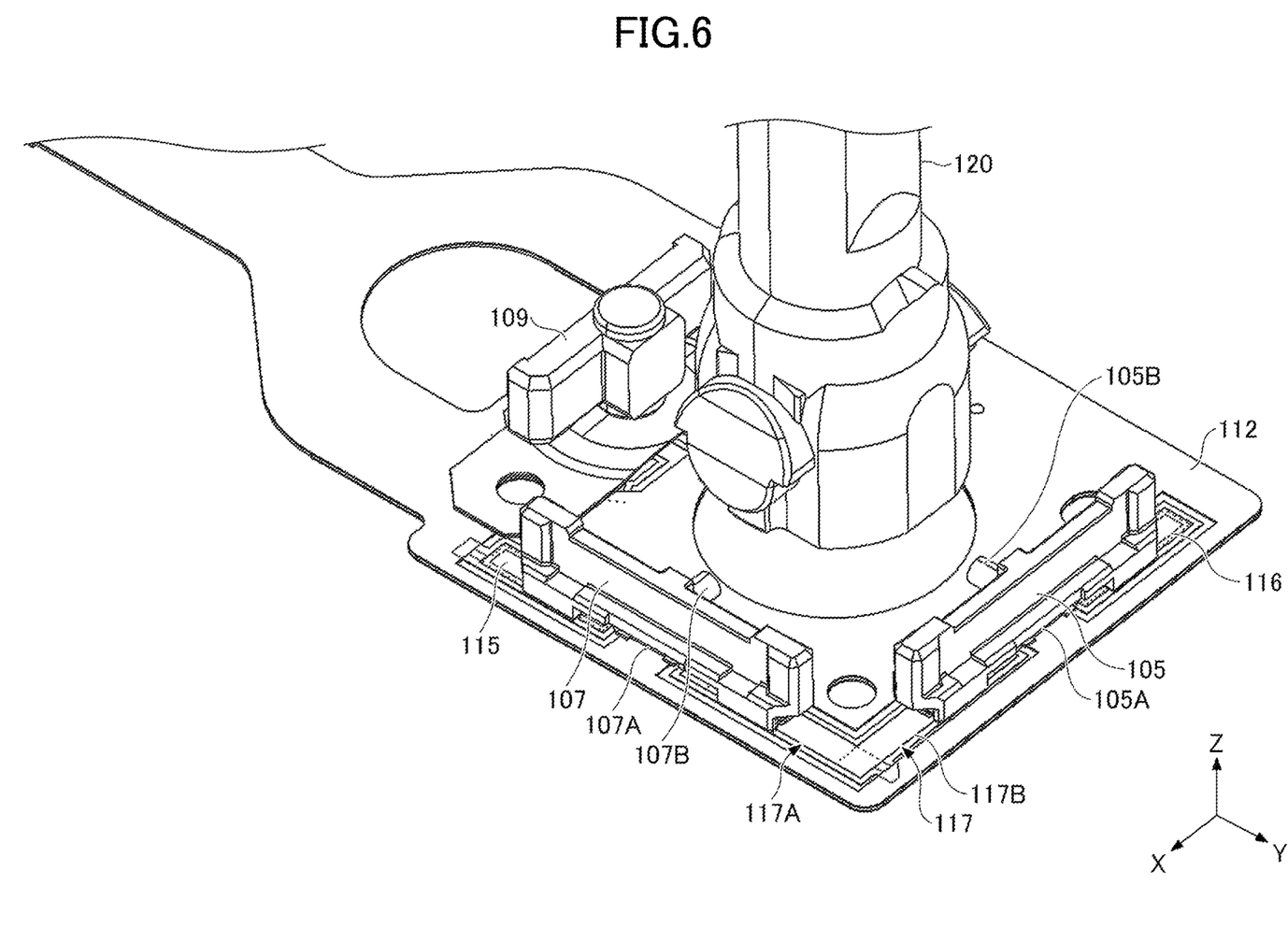
FIG. 6 is a diagram illustrating the arrangement of sliders on a surface of the FPC according to one embodiment.
Figure 7:
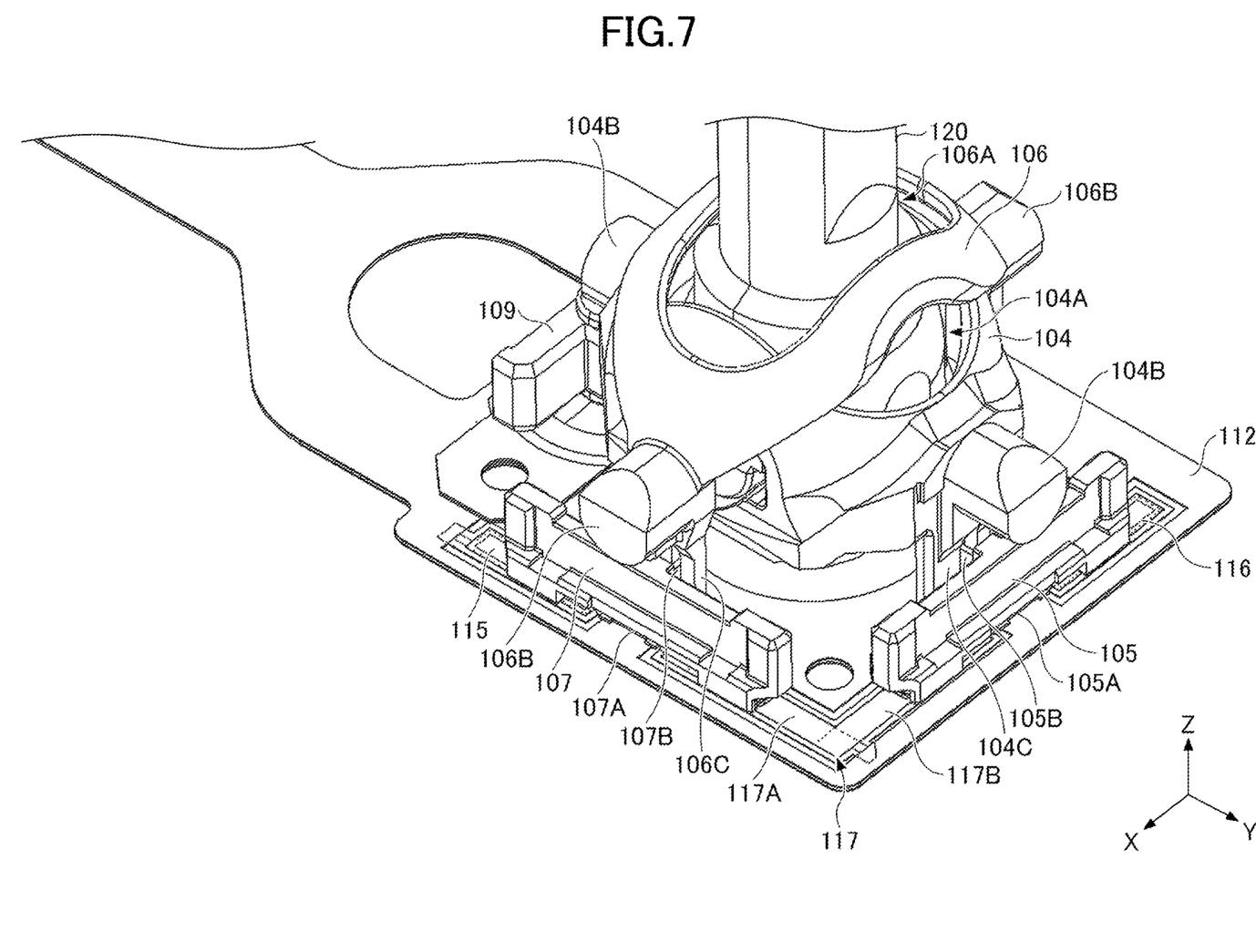
FIG. 7 is a diagram illustrating an engagement state of each slider with a corresponding actuator when viewed from above according to one embodiment.
Figure 8:
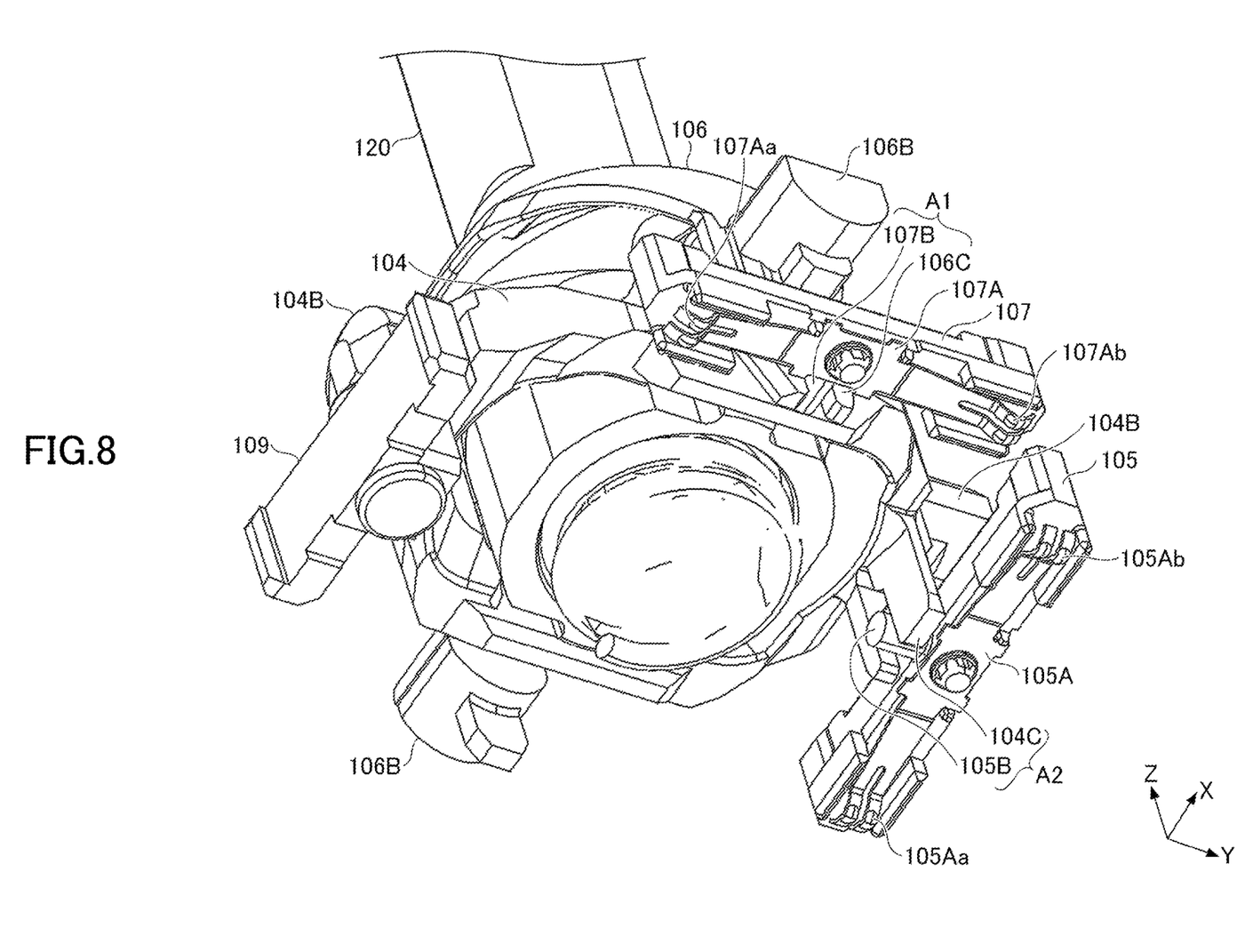
FIG. 8 is a diagram illustrating the engagement state of each slider with the corresponding actuator when viewed below according to one embodiment.

FIG. 6 is a diagram illustrating the arrangement of the sliders 105A and 107A on the surface of the FPC 112 according to one embodiment. FIG. 7 is a diagram illustrating an engagement state of the sliders 105A and 107A with the respective actuators 104 and 106 when viewed from above the sliders according to one embodiment. FIG. 8 is a diagram illustrating the engagement state of the sliders 105A and 107A with the respective actuators 104 and 106 when viewed from below the sliders according to one embodiment.

As illustrated in FIG. 6, on the surface of the FPC 112, the linear portion 117A of the resistor 117 and the resistor 115 are apart from each other and are provided linearly in the Y-axis direction so as to be along the front-side (positive X-axis side) edge of the FPC 112. As illustrated in FIG. 6, the first holder 107 is disposed to cover the surface of the linear portion 117A of the resistor 117 and the surface of the resistor 115. The first slider 107A, which is made of metal and is in the form of a leaf spring, is provided on a bottom surface of the first holder 107. The first slider 107A slides on the respective surfaces of the linear portion 117A and the resistor 115 (which is an example of a "first resistor"), in accordance with the movement of the first holder 107 in the Y-axis direction. Specifically, a contact 107Aa (see FIG. 8) that is provided at a negative Y-axis side end of the first slider 107A slides on the surface of the resistor 115. Also, a contact 107Ab (see FIG. 8) that is provided at a positive Y-axis side end of the first slider 107A slides on the surface of the linear portion 117A.

As illustrated in FIG. 6, on the surface of the FPC 112, the linear portion 117B of the resistor 117 and the resistor 116 are apart from each other, and are provided linearly in the X-axis direction so as to be situated along the right-side (positive Y-axis side) edge of the FPC 112. As illustrated in FIG. 6, the second holder 105 is disposed so as to cover the surface of the linear portion 117B of the resistor 117 and the surface of the resistor 116. The second slider 105A, which is made of metal and is in the form of a leaf spring, is provided on the bottom surface of the second holder 105. The second slider 105A slides on the respective surfaces of the linear portion 117B and the resistor 116 (which is an example of a "second resistor"), in accordance with the movement of the second holder 105 in the X-axis direction. Specifically, a contact 105Aa (see FIG. 8) that is provided at a negative X-axis side end of the second slider 105A slides on the surface of the resistor 116. Also, a contact 105Ab (see FIG. 8) that is provided at a positive X-axis side end of the second slider 105A slides on the surface of the linear portion 117B.

As illustrated in FIGS. 6 to 8, the second cylindrical protrusion 105B that protrudes toward the second actuator 104 is provided at the central portion of the side surface of the second holder 105 that is situated on the second actuator 104-side (negative Y-axis side). As illustrated in FIGS. 6 to 8, the second protrusion 105B engages with the second engagement portion 104C of the second actuator 104. The second protrusion 105B of the second holder 105 and the second engagement portion 104C of the second actuator 104 constitute a second drive transmission A2. With this arrangement, the second holder 105 moves in the front-back direction (X-axis direction) through the second drive transmission A2, in accordance with the rotation of the second actuator 104. In this case, the second slider 105A held by the second holder 105 slides on the respective surfaces of the linear portion 117B and the resistor 116 in the front-back direction (X-axis direction).

As illustrated in FIGS. 6 to 8, the first cylindrical protrusion 107B that protrudes toward the first actuator 106 is provided at the central portion of the side surface of the first holder 107 that is situated on the first actuator 106-side (negative X-axis side). As illustrated in FIGS. 6 to 8, the first protrusion 107B engages with the first engagement portion 106C of the first actuator 106. The first protrusion 107B of the first holder 107 and the first engagement portion 106C of the first actuator 106 constitute a first drive transmission A1. With this arrangement, the first holder 107 moves in the left-right direction (Y-axis direction) through the first drive transmission A1, in accordance with the rotation of the first actuator 106. In this case, the first slider 107A, held by the first holder 107, slides on the respective surfaces of the linear portion 117A and the resistor 115 in the left-right direction (Y-axis direction).

In such a configuration, in the operation device 100 according to one embodiment, the first slider 107A slides in the left-right direction (Y-axis direction) on the respective surfaces of the linear portion 117A and the resistor 115, in accordance with the tilting of the lever 120 in the left-right direction (Y-axis direction). With this arrangement, a resistance value between a terminal coupled to the resistor 117 and a terminal coupled to the resistor 115 changes in accordance with an amount of movement of the first slider 107A (that is, the tilt angle of the lever 120). An external device can detect the tilting of the lever 120 in the left-right direction (Y-axis direction) and a given tilt angle of the lever 120, based on changes in the resistance value between the two terminals.

In the operation device 100 according to one embodiment, the second slider 105A slides in the front-back direction (X-axis direction) on the respective surfaces of the linear portion 117B and the resistor 116, in accordance with the tilting of the lever 120 in the front-back direction (X-axis direction). With this arrangement, a given resistance value between the terminal coupled to the resistor 117 and the terminal coupled to the resistor 116 changes in accordance with an amount of movement of the second slider 105A (that is, the tilt angle of the lever 120). The external device can detect the tilting of the lever 120 in the front-back direction (X-axis direction) and a given tilt angle of the lever 120, based on changes in the resistance value between the two terminals.

(Configuration in Which Lever 120 Forces First Actuator 106 Upward)

Figure 9:
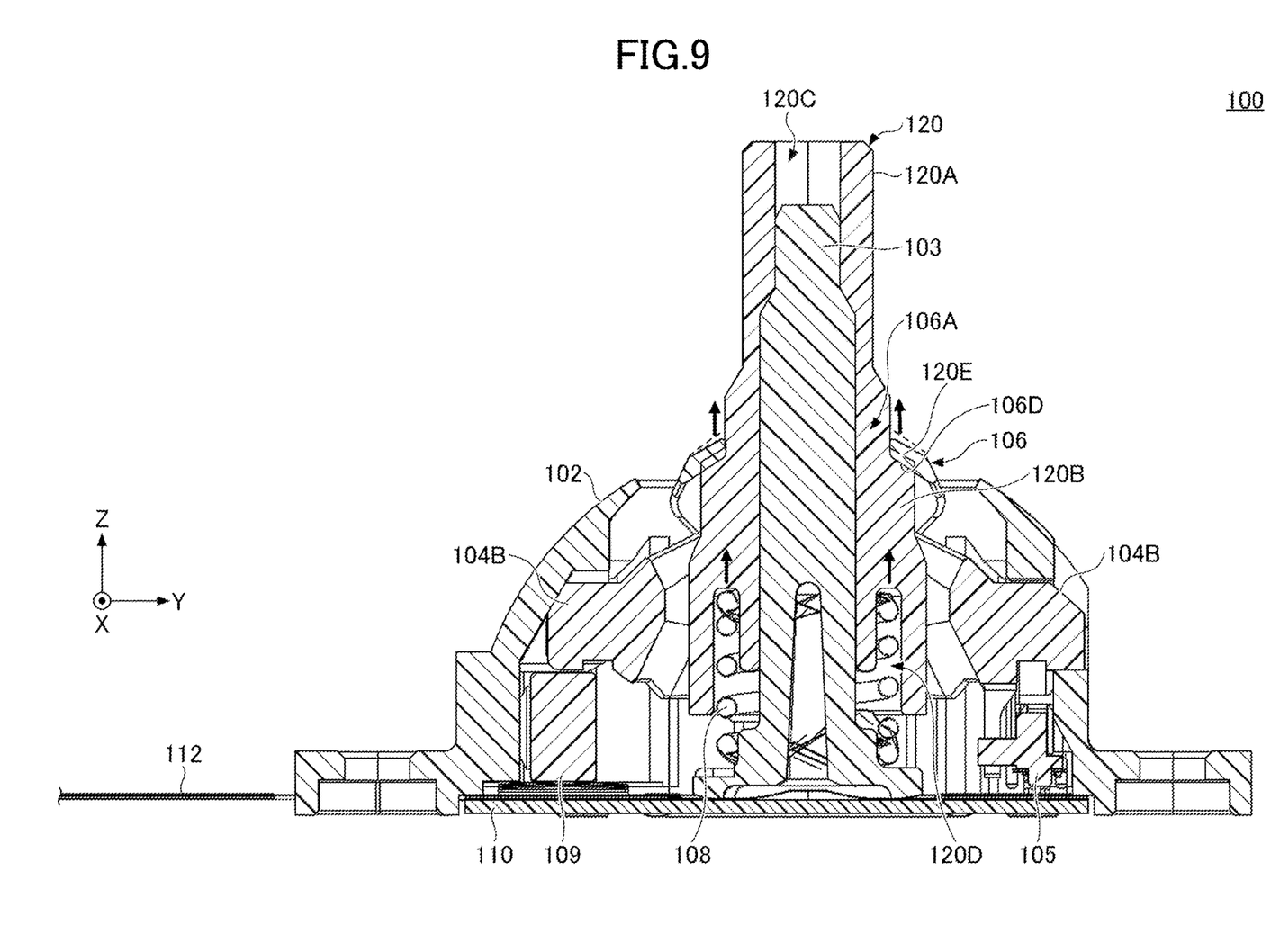
FIG. 9 is a cross-sectional view of the operation device taken along a YZ plane according to one embodiment.
Figure 10:
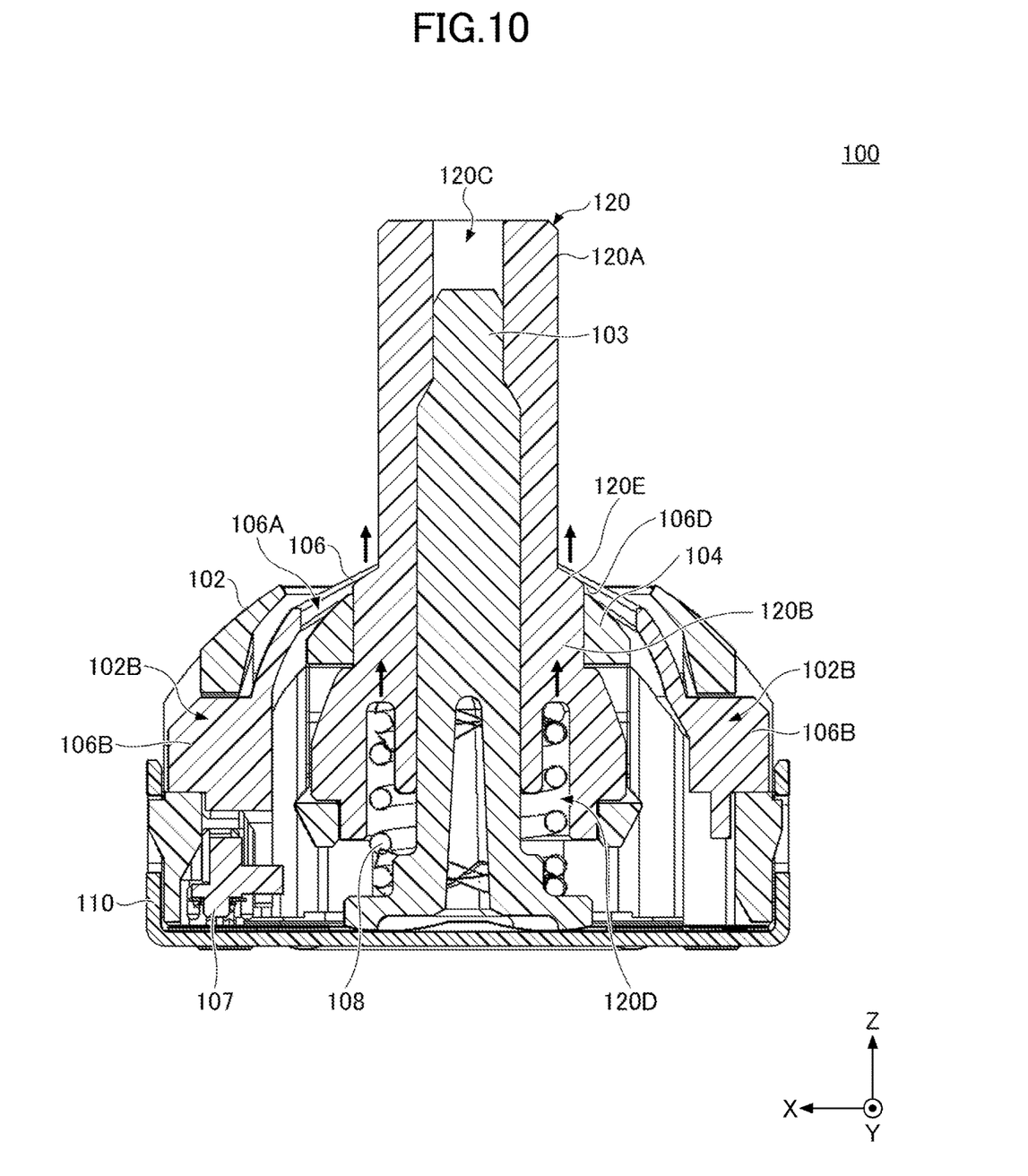
FIG. 10 is a cross-sectional view of the operation device taken along an XZ plane according to one embodiment.

FIG. 9 is a cross-sectional view of the operation device 100 taken along the YZ plane according to one embodiment. FIG. 10 is a cross-sectional view of the operation device 100 taken along the XZ plane according to one embodiment. As illustrated in FIGS. 9 and 10, in the operation device 100 according to one embodiment, the lever 120 is disposed to pass through the opening 106A of the first actuator 106.

As illustrated in FIG. 9, the lever portion 120A of the lever 120 has a diameter smaller than a diameter of the opening 106A. The lever portion 120A passes through the opening 106A so that the lever portion 120A is located above the opening 106A.

As illustrated in FIG. 9, the base 120B of the lever 120 is provided under the lever portion 120A. The base 120B has a diameter greater than the diameter of the opening 106A, and is partially located lower than the opening 106A without passing through the opening 106A.

As illustrated in FIGS. 9 and 10, a push-up portion 120E is formed at an upper end of the base 120B (i.e., at a middle portion between the lever portion 120A and the base 120B). The push-up portion 120E is a portion that is formed based on a difference in the diameter between the lever portion 120A and the base 120B. The push-up portion 120E is an annular portion that has a surface, and the annular portion is expanded outward in a radial direction from the outer circumferential surface of the lever portion 120A (i.e., the annular portion surrounds the outer peripheral surface of the lever portion 120A). As illustrated in FIG. 9, the push-up portion 120E contacts a portion of the first actuator 106 at a lower surface 106D and around the opening 106A. The lever 120 is biased upward by the spring 108. With this arrangement, the lever 120 forces the first actuator 106 upward at the push-up portion 120E. As a result, the portion of the first actuator 106 around the opening 106A is slightly deflected upward. In addition, looseness between the lever 120 and the first actuator 106 is avoided.

As illustrated in FIGS. 9 and 10, the push-up portion 120E has an inclined surface that goes down so as to be lower as the inclined surface exists outwardly radially. Similarly, the lower surface 106D of the first actuator 106 has an inclined surface that extends downward so as to be lower as the inclined surface exists outwardly radially. That is, the push-up portion 120E and the lower surface 106D come into contact with each other at the respective inclined surfaces. An inclination angle of the push-up portion 120E and an inclination angle of the lower surface 106D are substantially the same. With this arrangement, the operation device 100 according to one embodiment can suppress frictional resistance between the push-up portion 120E and the lower surface 106D, when the lever 120 is tilted in the X-axis direction.

(Configuration in Which Rotation Shaft 106B is Supported Within Shaft-Receiving Hole 102B of Case 102)

Figure 11:
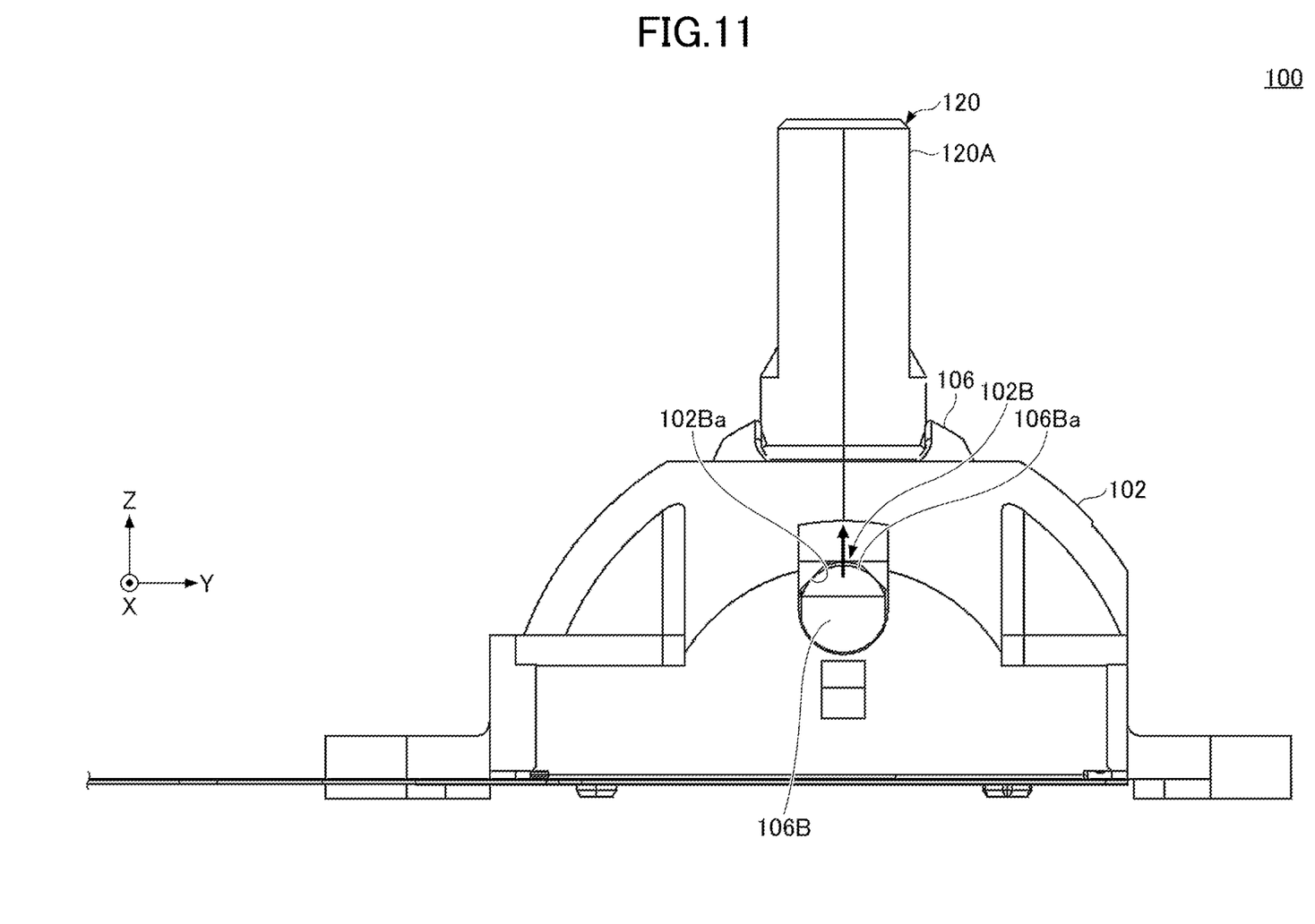
FIG. 11 is a lateral view of the operation device from which a frame is removed according to one embodiment.

FIG. 11 is a lateral view of the operation device 100 from which the frame 110 is removed according to one embodiment. As illustrated in FIG. 11, the rotation shaft 106B of the first actuator 106 is rotatably supported within the shaft-receiving hole 102B of the case 102.

As illustrated in FIG. 11, the rotation shaft 106B has a cylindrical shape. That is, an outer peripheral surface 106Ba of the rotation shaft 106B has a curved shape that is curved along the circumference of a circle equivalent to the outer peripheral surface 106Ba. An upper inner wall surface 102Ba of the shaft-receiving hole 102B that faces the outer peripheral surface 106Ba of the rotation shaft 106B has a tapered shape in which an opening width of the shaft-receiving hole 102B in the left-right direction (Y-axis direction) narrows as the inner wall surface 102Ba exists upwardly.

As described with reference to FIGS. 9 and 10, the first actuator 106 is forced upward by the push-up portion 120E of the lever 120. With this arrangement, the outer peripheral surface 106Ba of the rotation shaft 106B in the first actuator 106 is pressed against the upper inner wall surface 102Ba of the shaft-receiving hole 102B in the case 102. Thus, backlash from the rotation shaft 106B with respect to the shaft-receiving hole 102B is avoided, and the rotation shaft 106B is also positioned at a central location of the shaft-receiving hole 102B in the left-right direction (Y-axis direction).

As a result, when the lever 120 returns to the neutral state, the operation device 100 according to one embodiment can more reliably return the first holder 107 to the neutral position. The operation device 100 can also output a value of the output signal, indicating the neutral state. With this arrangement, in the operation device 100 according to one embodiment, accuracy in returning an output value of the output signal to a value indicating the neutral state can be increased when the lever 120 returns to the neutral state.

(Configuration in Which Rotation Shaft 104B Forces Pressing Member 109 Downward)

Figure 12:
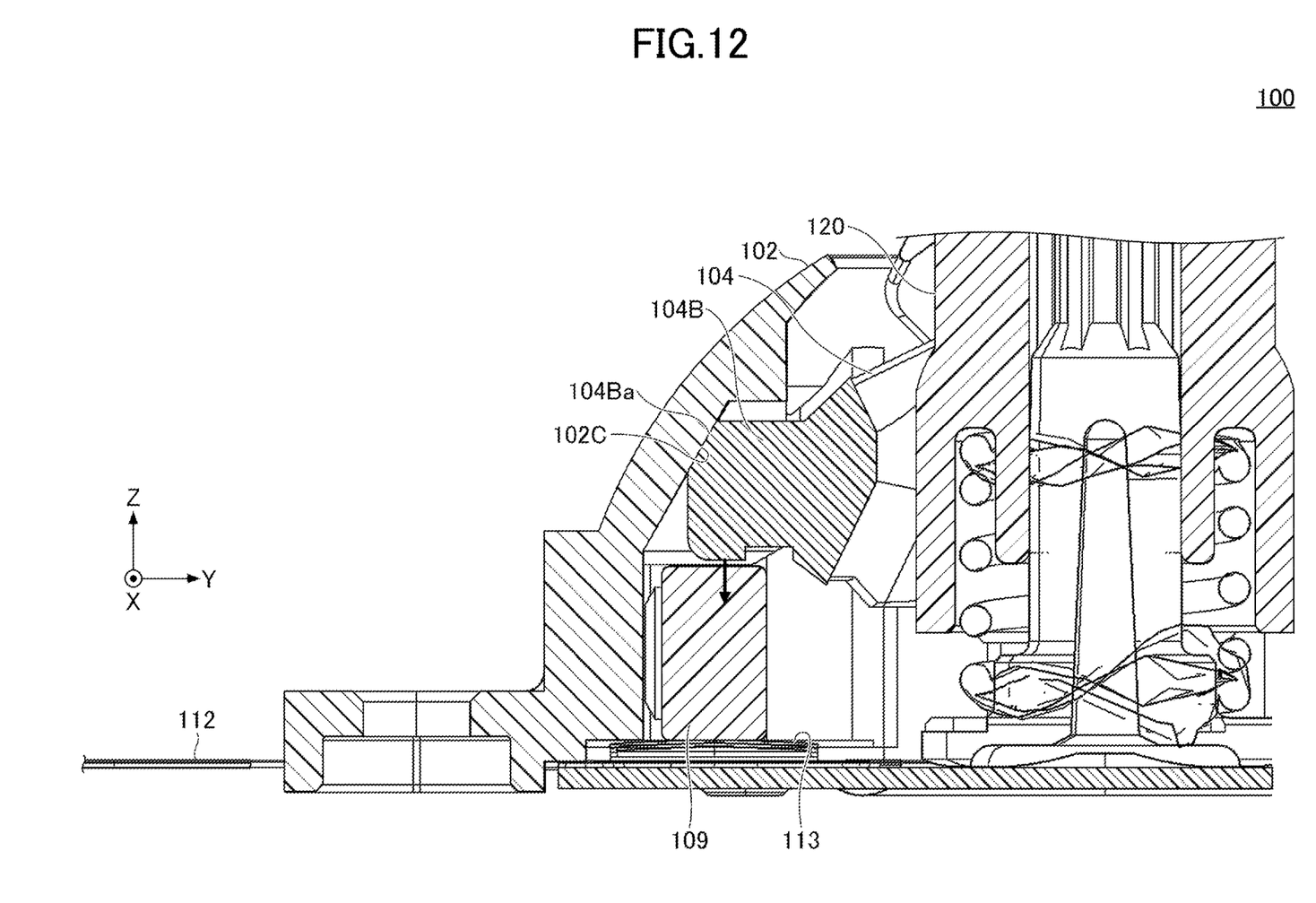
FIG. 12 is a partially enlarged cross-sectional view of the operation device illustrated in FIG. 9.

FIG. 12 is a partially enlarged cross-sectional view of the operation device 100 illustrated in FIG. 9. As illustrated in FIG. 12, in the operation device 100 according to one embodiment, the pressing member 109 is provided under the rotation shaft 104B on the negative Y-axis side of the second actuator 104. Also, in the operation device 100 according to one embodiment, the metal sheet 113 is provided under the pressing member 109. With this arrangement, in the operation device 100 according to one embodiment, when the lever 120 is forced downward, the pressing member 109 is forced downward by the rotation shaft 104B on the negative Y-axis side of the second actuator 104, and thus the pressing member 109 can press the metal sheet 113.

As illustrated in FIG. 12, an inclined surface 104Ba is formed at an end surface of the rotation shaft 104B on the negative Y-axis side of the second actuator 104. Also, an inclined surface 102C is formed at a location of an inner wall surface of the case 102 that faces the inclined surface 104Ba. As illustrated in FIG. 12, the inclined surface 104Ba and the inclined surface 102C are in contact with each other. The inclined surface 104Ba and the inclined surface 102C have the same inclination angle. The inclination angle of each of the inclined surface 104Ba and the inclined surface 102C, relative to the XY plane, is greater than 45°. With this arrangement, in the operation device 100 according to one embodiment, when the lever 120 is forced downward, the rotation shaft 104B on the negative Y-axis side of the second actuator 104 can be prevented from moving in the negative Y-axis direction. That is, the pressing member 109 can be forced vertically downward (in the negative Z-axis direction) as much as possible by the rotation shaft 104B.

Although one or more embodiments are described in detail above, the present disclosure is not limited to the embodiments, and various modifications or changes can be made within the scope described in the present disclosure.

According to an operation device according to one embodiment, accuracy in returning to a value of an output signal indicating a neutral state can be improved when a lever returns to the neutral state.

What is claimed is:

1. An operation device comprising:
    a case having a shaft-receiving hole;
    a lever operable to tilt laterally and including:
        a lever portion including a lower end and protruding upward from the case, and
        a base supporting the lower end of the lever portion;
    an actuator having an opening through which the lever portion passes and including a rotation shaft supported by the case, the actuator being configured to rotate in accordance with the tilting of the lever, such that the rotation shaft of the actuator is rotatably supported within the shaft-receiving hole in the case; and
    a biasing unit configured to bias the lever upward,
    wherein the lever includes a push-up portion configured to contact a peripheral portion of the opening of the actuator in response to a biasing force from the biasing unit to force of the actuator upward.

2. The operation device according to claim 1, wherein the shaft-receiving hole defines an upper inner wall surface that is tapered such that an opening width of the shaft-receiving hole gradually narrows in accordance with an increasing height.

3. The operation device according to claim 1, wherein the push-up portion and the peripheral portion of the opening of the actuator respectively have inclined surfaces, and
    wherein the respective inclined surfaces of the push-up portion and the peripheral portion of the opening of the actuator are in contact with each other.

* * * * *